Jan. 17, 1950 H. LIND 2,494,662
POWER LAWN MOWER
Filed Feb. 4, 1946 3 Sheets-Sheet 3
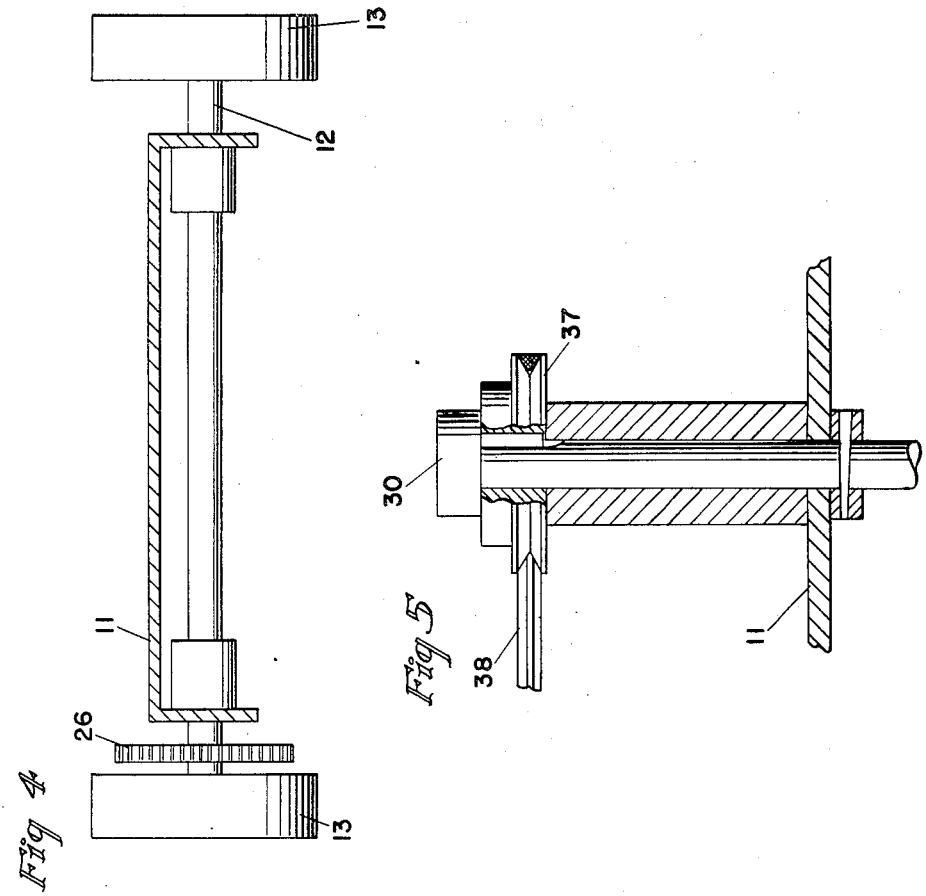
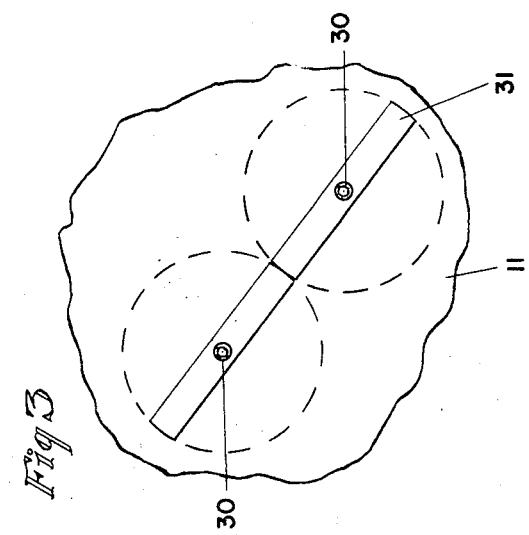
INVENTOR.
Henning Lind
BY Victor J. Evans & Co.
ATTORNEYS Patented Jan. 17, 1950

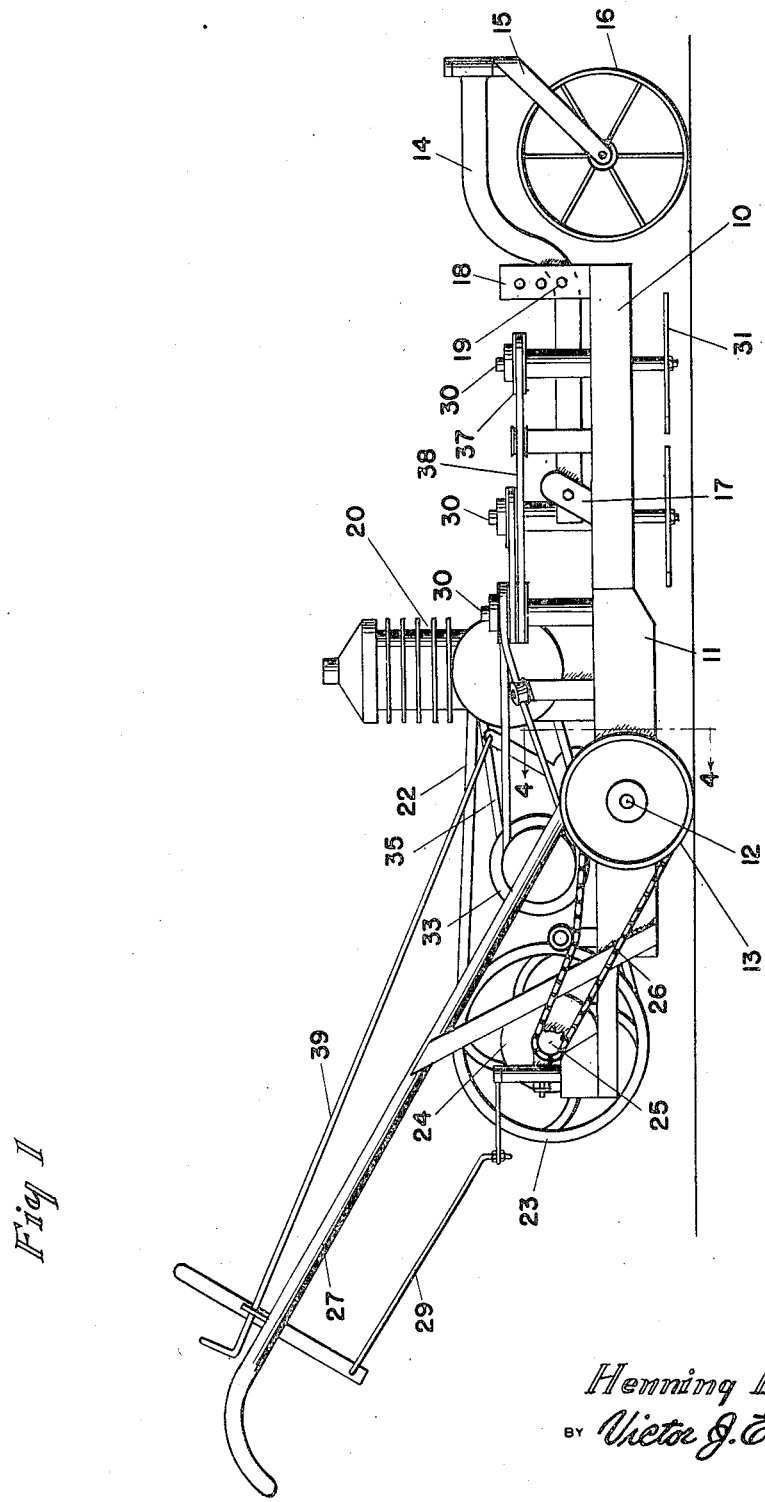

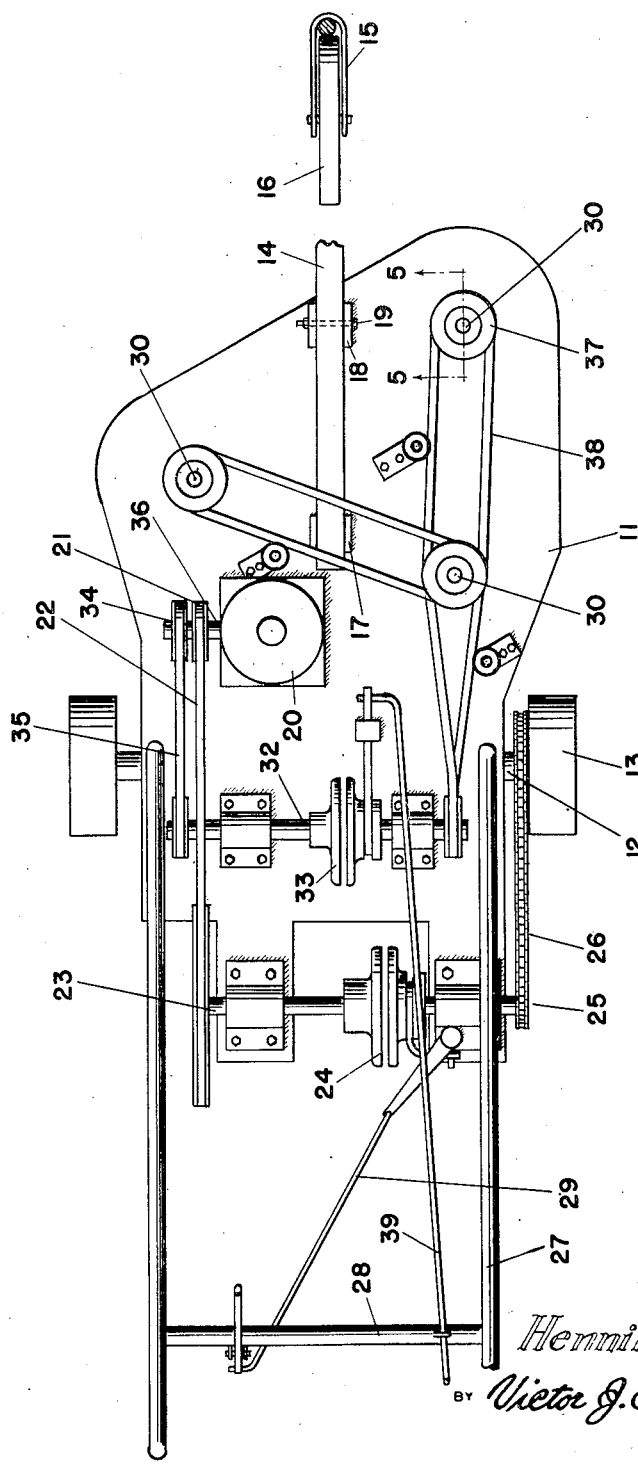

2,494,662

UNITED STATES PATENT OFFICE 2,494,662

POWER LAWN MOWER

Henning Lind, Osage City, Kans.

Application February 4, 1946, Serial No. 645,333

2 Claims. (Cl. 56—25.4)

1

The invention relates to a lawn mower, and more especially to a motor powered lawn mower.

The primary object of the invention is the provision of a machine of this character, wherein the cutters are disposed at opposite sides of the frame of the said machine, so that cutting action will be had at either of such sides, thereby enabling the lawn to be mowed close to a hedge and at one side or the other thereof, the cutters being rotatable for horizontal sweep action and are motor driven.

Another object of the invention is the provision of a machine of this character, wherein the motive power can be utilized for driving the machine or for driving the cutters, or driving both, and the course of such machine being manually controlled by hand steering thereof.

A further object of the invention is the provision of a machine of this character, wherein the cutting level of the same can be regulated with ease and dispatch, so that such machine can cut long or short grass or other growths, the machine being susceptible of positive control, possessed of few parts, thus economical in repairs, adjustments and replacement of such, and is novel in construction and unique in arrangement.

A still further object of the invention is the provision of a machine of this character, which is simple in construction, thoroughly reliable and efficient in operation, strong, durable, readily and easily handled, compact, assured of maximum power, and inexpensive to manufacture and install.

With these and other objects in view the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings:

Figure 1 is a side view of the machine constructed in accordance with the invention.

Figure 2 is a top plan view thereof.

Figure 3 is a fragmentary bottom plan view showing the relation of the rotary cutters with respect to each other.

Figure 4 is a transverse sectional view taken approximately on the line 4—4 of Figure 1.

Figure 5 is a sectional view taken on the line 5—5 of Figure 2.

Similar reference characters indicate corresponding parts throughout the several views in the drawings.

2

Referring to the drawings in detail, the machine constituting the present invention, which is in the form of a powered lawn mower, comprises a horizontally disposed platform-like main body 10, preferably of the shape shown in Figure 2, having journaled in opposite depending side flanges 11 thereto a driving axle 12, carrying rear traction wheels 13, while at the fore of such body is a superposed vertically swingable front tongue 14, having swiveled in its forward end a front wheel fork 15, in which is journaled a front wheel 16. The tongue 14 is pivoted in a bearing 17 at its rear end and upstanding from the body 10, while the forward portion of such tongue is adjustably engaged in a bifurcated rack 18, which also rises from the body, and this tongue is held in adjusted position in a vertical direction by a latching key 19, so that the said body 10 can be held in a raised or lower position forwardly thereof relative to the foundation over which the machine is to travel. The tongue is aligned with the longitudinal median of the machine.

Upon the platform body 10 is mounted a power motor 20 having pulley and belt connections 21 and 22, respectively, with a transmission shaft 23, which includes a release clutch 24, for the starting and stopping of the latter, the said shaft through sprocket chain and sprocket gear connections, 25 and 26, respectively, drives the rear axle 12 and its wheels 13, so that the machine will be driven from the motor 20.

Rising from the rear end of the body 10 are forwardly inclined handle bars 27, and mounted on the cross rung 28 thereof is a clutch release control lever 29, which operates the clutch 24 to stop or start the travel of the machine, the lever being manually operated.

Journaled in the body 10 near opposite side edges thereof and fore of the same are vertically disposed rotatable cutter spindles 30, which extend above and below the said body, and the lower ends of these spindles have fixed thereto lateral sweep rotary cutter blades 31, each being arranged in close clearing relation to each other, as best seen in Figure 3 of the drawings for cooperative lawn cutting operations. The cutters are suspended beneath the body 10 at a determined level.

A supplemental transmission shaft 32 is supported on the body 10, and includes a release clutch 33, while this shaft has pulley and belt connections 34 and 35, respectively, with the driving shaft 36 of the motor 20, and pulley and belt connections 37 and 38, respectively, with the spindles 30, so that the cutters will be operated from the motor.

The clutch 33 is regulated by a release control lever 39, which is also mounted on the cross rung 28 of the handle bars 27, whereby both levers 29 and 39 will be in handy reach of the user of the machine, the clutch 33 being for stopping and starting the cutters 31, thus it should be seen that the machine is self propelled and the cutters rotated independently.

By the raising or lowering of the tongue 14 the cutters can be regulated for cutting long or short grass or other growths, such as weeds or the like. The disposition of the cutters enables the machine to travel close to a hedge and at either side thereof for lawn mowing. A differential gear mechanism, not shown, can be included with the rear axle, so as to enable the machine to be turned in either direction off a straight course in the travel thereof.

What is claimed is:

1. A machine of the kind described, comprising a flat horizontally disposed platform body, traction wheels carried by the body aft thereof, a vertically-swingable tongue fore of said body, a front steering wheel swivelled in said tongue, a power motor supported on the body, rotary spindles perpendicularly arranged on the body near opposite side edges and extended below such body, lateral sweep cutting blades at the lower ends of the spindles, and operating in close clearing relation to each other aft of the wheel, a clutch-released connection whereby said traction wheels may be intermittently driven from said power motor, and a second clutch-released connection whereby said spindles and said lateral sweep cutting blades may be intermittently operated.

2. A machine of the kind described, comprising a flat horizontally disposed platform body, traction wheels carried by the body aft thereof, a vertically-swingable tongue fore of said body, a front steering wheel swivelled in said tongue, a power motor supported on the body, rotary spindles perpendicularly arranged on the body near opposite side edges and extended below such body, lateral sweep cutting blades at the lower ends of the spindles, and operating in close clearing relation to each other aft of the wheel, a clutch-released connection whereby said traction wheels may be intermittently driven from said power motor, and a second clutch-released connection whereby said spindles and said lateral sweep cutting blades may be intermittently operated, handle bars rising from the body, and clutch controls mounted thereon for the clutch release connections.

HENNING LIND.

REFERENCES CITED

The following references are of record in the file of this patent:

UNITED STATES PATENTS

| Number | Name | Date |
| --- | --- | --- |
| 2,076,056 | Woodford | Apr. 6, 1937 |
| 2,134,115 | Flammang | Oct. 25, 1938 |
| 2,229,363 | Bishop | Jan. 21, 1941 |
| 2,243,133 | Steiner et al. | May 27, 1941 |